United States Patent
Bozinovic et al.

(10) Patent No.: US 9,451,291 B1
(45) Date of Patent: Sep. 20, 2016

(54) FAST DWT-BASED INTERMEDIATE VIDEO CODEC OPTIMIZED FOR MASSIVELY PARALLEL ARCHITECTURE

(71) Applicants: Radmilo Bozinovic, San Jose, CA (US); Zeljko Markovic, San Jose, CA (US)

(72) Inventors: Radmilo Bozinovic, San Jose, CA (US); Zeljko Markovic, San Jose, CA (US)

(*) Notice: Subject to any disclaimer, the term of this patent is extended or adjusted under 35 U.S.C. 154(b) by 0 days.

(21) Appl. No.: 14/840,519

(22) Filed: Aug. 31, 2015

(51) Int. Cl.
| | |
|---|---|
| *G06K 9/36* | (2006.01) |
| *H04N 19/91* | (2014.01) |
| *H04N 19/169* | (2014.01) |
| *H04N 19/63* | (2014.01) |
| *H04N 19/44* | (2014.01) |
| *H04N 19/124* | (2014.01) |
| *H04N 19/167* | (2014.01) |

(52) U.S. Cl.
CPC ............ *H04N 19/91* (2014.11); *H04N 19/124* (2014.11); *H04N 19/167* (2014.11); *H04N 19/1887* (2014.11); *H04N 19/44* (2014.11); *H04N 19/63* (2014.11)

(58) Field of Classification Search
None
See application file for complete search history.

(56) References Cited

U.S. PATENT DOCUMENTS

| | | | | |
|---|---|---|---|---|
| 2005/0283780 | A1* | 12/2005 | Karp ................... | G06F 9/3004 718/100 |
| 2011/0254712 | A1* | 10/2011 | He ...................... | H03M 7/40 341/87 |
| 2013/0182775 | A1* | 7/2013 | Wang .................. | H04N 19/46 375/240.24 |

\* cited by examiner

*Primary Examiner* — Eueng-Nan Yeh

(57) ABSTRACT

A method and apparatus for scalable symmetric data compression and decompression (codec), optimized for real-time processing of high-resolution continuous-tone 2D input, such as video and images. Following a dyadic n-level DWT decomposition of input, the coding of subbands is spatially partitioned to enable strong parallelism that maps into concurrent encoding threads, based on typical artifacts of H-bands on initial levels—large areas of contiguous zeros interspersed with sparse and highly redundant non-zero values. Variable length codewords of both non-zero values and their positions are mapped into a linear bitstream by a combined limited sequential and parallel procedure of at most $\log_2 n$ iterations, with both lossless and lossy variants enabled. The compressed bitstream of self-delimiting entries is decoded in a symmetric iterative procedure that delivers to decoding threads the non-zero values and position codewords for final image restoration.

18 Claims, 10 Drawing Sheets

Example input coefficient plane

*j*=0: ( 10 8 13 4 3 4 2 | [VLC string of 11 codewords for NZVs] )

*j*=1: ( 10 14 9 | 10 8 13 4 3 4 2 | [VLC string of 11 codewords for NZVs] )

*j*=2: ( 14 | 10 14 9 | 10 8 13 4 3 4 2 | [VLC string of 11 codewords for NZVs] )

FIG. 9

CONTROL ARRAY                           PATTERN ARRAY j=0:  (3 0 0 0 0 0 0 0 0 0 0 0 0 0 0 0)      ;    ( 14 0 0 0 0 0 0 0 0 0 0 0 0 0 0 0 )

FAST DWT-BASED INTERMEDIATE VIDEO CODEC OPTIMIZED FOR MASSIVELY PARALLEL ARCHITECTURE

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not applicable

BACKGROUND OF THE INVENTION

Traditionally, compression (specifically for image/video) has focused on achieving maximum compression rates by eliminating redundancy (approaching entropy) at great cost, by good analysis of the limited set of input domains. Specifically, this often meant elaborate pattern matching or clever statistical parameter estimation for a known class of distributions (in the limit exemplified by the "Hutter prize" framework). Theoretical limitations have been well understood for some time now, implying formal absence of a universal solution—mathematically speaking, the general problem of minimal Kolmogorov complexity is not a computable function. Nonetheless, practical work was focused on a handful of industry-backed standards of increasing complexity or specialization, typically based on a sequential processing model. (e.g. H.264/5).

Rapidly increasing image sensor resolutions (primarily in strictly spatial resolution, but also in bit depth and video frame rate) imply an exponential growth of the domain and variety of input material. Concurrently, rapidly dropping costs of sensor devices and supporting transmission and storage technologies made these advances broadly available in consumer devices. Consequently, current standards cannot nearly cover all of these emerging needs and application contexts, particularly in the combination of high throughput and low cost. Due to a scalability that naturally follows from its dyadic hierarchical representation, the class of DWT-based subband approaches (the JPEG2000 standard most prominent among them) has emerged as a viable candidate for this challenge, utilized for still images as well as video in the I-frame only mode (i.e. independently coded frames with no temporal information considered). Several references articulate these issues clearly, e.g. D. S. Taubman and M. W. Marcellin, "JPEG2000 Image Compression Fundamentals, Standards and Practice", Springer Science+Business Media, 2002. Efficient lifting methods of implementing the DWT have been disclosed in "Efficient wavelet-based compression of large images" (U.S. Pat. No. 6,546,143 B1) and elsewhere.

Another natural approach to further scale up with the galloping high-throughput demand is by leveraging massively parallel architectures, increasingly affordable as SW-programmable GPGPUs, while also implementable is HW-based FPGA and ASIC solutions. This requires identifying strong (coarse-grained) parallelism, i.e. increasing the proportion P of parallel operations in the model underlying Amdahl's Law. Research has identified the major obstacles for adapting JPEG2000 further toward such coarse-grained parallelism, i.e., scaling up with increased resolutions, as disclosed in: J. Matela et al, "Efficient JPEG2000 EBCOT Context Modeling for Massively Parallel Architectures", Data Compression Conference (DCC'11), pp. 423-432, Snowbird, USA, 2011; J. Matela, "GPU-Based DWT Acceleration for JPEG2000", Annual Doctoral Workshop on Mathematical and Engineering Methods in Computer Science, pp. 136-143, 2009; J. Franco et al., "A Parallel Implementation of the 2D Wavelet Transform Using CUDA, Univ. de Murcia, Spain. In this standard, ⅔ of its major components (i.e., the actual compression) are known to be computationally very intensive, with most processing time spent in the EBCOT context-based adaptive bit-plane arithmetic coder (context modeling and arithmetic coding profiled as accounting for 61% in some studies, over 70% in others). The present invention defines a suitable, highly parallel replacement for the state-of-the-art EBCOT bit-plane coding method, enabling a reduction in processing time while considering key local data that are still most amenable to good compression rates.

More specifically, this translates focus to a processing granularity that seeks optimal balance between compact 2D locality (enabling higher degrees of parallelization and consequent speedup) and size coverage (retaining higher compression rates). It has long been understood in prior art dealing with concurrent programming that "many non-local calculations, virtually trivial on single-thread systems, like counting non-zero pixels in a 2D image, become hard to solve on the GPU, since its inherently parallel nature can only be utilized if the output of several parallel units is combined" (as disclosed in: G. Ziegler et al, "GPU PointList Generation using HistoPyramids", Proc. VMV2006, Germany, 2006, pp. 137-144), and that resolving issue that will require new, explicitly parallel methods.

The present invention is premised on the fact that in DWT-based processing of UHD input the main redundancy (and consequent compression potential) comes from typical artifacts of H-bands on initial levels—large areas of contiguous zeros interspersed with sparse and highly redundant non-zero values (NZV). The postulated optimal balance between compact 2D locality and size coverage, is a achieved by hierarchically combining results from several parallel units in a manner that retains minimal encoding (ideally, single bit) for large contiguous 2D zero areas. Prior art has identified the concept of "reduction operator" (as disclosed in: G. Ziegler et al, "RealTime QuadTree Analysis using HistoPyramids", Proc. of IS&T and SPIE Conf. on Electronic Imaging, 2007), used by independent threads, which repeatedly processes four input cells into one, starting at the resolution level of the original input image, eventually geared at generating quadtree data structures; specifically, the cited work described this basic concept in the context of HistoPyramids and QuadPyramids of a QuadPyramid Builder. However, the cited prior art was generated in the context of solving other problems, with a focus on access methods, traversibility, etc. It did not explicitly focus on issues of data compression nor can it be obviously extended in that direction; consequently, it does not recognize or separate operations of coding and decoding.

One aspect of the present invention allows for moderate amount of lightweight and strategically focused adaptation in a way that does not compromise strong parallelism or add bulky side information.

As indicated above, most redundancy and savings come from relatively localized (spatio-temporally) contexts, which allows to avoid combinatorial explosions in context modeling and estimation, maintain causality, and avoid possibly massive side information to be transmitted. This in turn enables specific benefits: a) real-time (including low-latency) processing; b) random access (temporal) and non-linear editing (NLE) capability for video-material; c) random access (spatial), allowing region-of-interest (ROI) focus and flexibility.

For the given requirements, classical VLC coding (e.g. Elias beta/gamma, Golomb-Rice) appears preferable over Huffman-style recalculated/adaptive entropy (arithmetic, range) coding in terms of both lower computational complexity and lack of inherent sequential bias for the given problem. A limited number of predetermined distributions usually adequately model high-band coefficient magnitude values. Generally, principles of VLC are well-known to one skilled in the art, having been described in standard references, e.g., D. Salomon and P. Motta, "Handbook of Data Compression", Springer, 2010.

Parameter estimation for the underlying distributions should combine locality for focus and globally observed correlation among frames/planes/bands of a single source. Further lossless compression gains achieved by identifying band-specific local patterns of small non-zero coefficients and signs, and using appropriate entropy coding on such local vectors. Appropriately designed code stream and overall file format allow for optimal just-in-time decoding while providing the desired scalability.

Basic notions of concurrent (parallel) programming—including threads, synchronization and common memories—should be well known to one skilled in the art, and have been described in standard references, e.g., M. Raynal, "Concurrent Programming: Algorithms, Principles and Foundations", Springer, 2013.

Finally, it should be pointed out that one of the multiple practical classifications of codecs defines the following three basic classes:
1. Acquisition
2. Intermediate
3. Distribution The key distinguishing criterion here is the work balance between the two codec ends; in addition to the more traditional type 3 applications (compress once, decode many—e.g. distribution and broadcast of film material), there are many now that fall into types 2 (symmetric—e.g. digital film editing workflow) or 1 (inexpensive and ubiquitous coding, infrequent and more elaborate decoding—e.g. sparse representation, distributed multiple description coding, compressive sensing). Most practical flexibility comes from intermediate codecs, and the balance of compression and decompression efforts would put the present invention in that class.

BRIEF SUMMARY OF THE INVENTION

The present invention gives a method and apparatus that incorporate new features into generally known DWT-based compression frameworks in a manner that enables utilizing parallel architectures (concurrent programming) in segments hitherto mostly limited to sequential processing models—specifically, entropy coding. The method and apparatus are particularly designed for compression and decompression of large 2D input data, such as images and video frames. In the context of a DWT-based hierarchical subband decomposition of the input, 2D arrays of highly redundant H-band coefficients are compressed by means of a scalable iterative mechanism combining cooperating massively parallel units (threads) with sequential modules that manage and combine thread results, generating a compressed linear bitstream. A symmetric process performs the reverse function of decompressing this bitstream back into original 2D data.

The advantages of dyadic subband DWT-based compression frameworks known from prior art are thereby extended in a manner that enables high throughput processing, i.e., low-latency real-time coding and decoding of large input. At the same time, the system allows for retaining meaningful degrees of compression by focusing on redundancies that are either local or scale up in a compact representation.

In one aspect of the present invention, variable-length codes for both non-zero coefficient values and their positions within sparse arrays are combined in a compact linear representation by means of scalable and massively parallel thread units, based on quadtree principles known from prior art.

Other advantages and aspects of the present invention will become apparent from the following detailed description, considered in conjunction with accompanying drawings, including an example that illustrates the principles of the invention.

BRIEF DESCRIPTION OF THE DRAWINGS

FIG. 9 shows contents of LIFO 210 at the end of each of 3 example encoding iterations, with 0-based iteration index j. As noted in sec. 2, the virtual record delimiter "|" is used for illustration purposes only and is not part of the actual LIFO. For simplicity, pattern values are given in their uncoded decimal form.

FIG. 10 shows contents of control array 602 (active elements shown in underlined bold) and pattern array 604 in each of 3 example decoding iterations, with 0-based iteration index j.

DETAILED DESCRIPTION OF THE INVENTION

The present invention is embodied in methods and apparatuses for compression and decompression of large 2D input data, such as images and video frames. In the context of a DWT-based hierarchical subband decomposition of the input, 2D arrays of highly redundant H-band coefficients are compressed by means of a scalable iterative mechanism combining cooperating massively parallel units (threads)

with sequential modules that manage and combine thread results, generating a compressed linear bitstream. A symmetric process performs the reverse function of decompressing this bitstream back into original 2D data.

Figure 1:
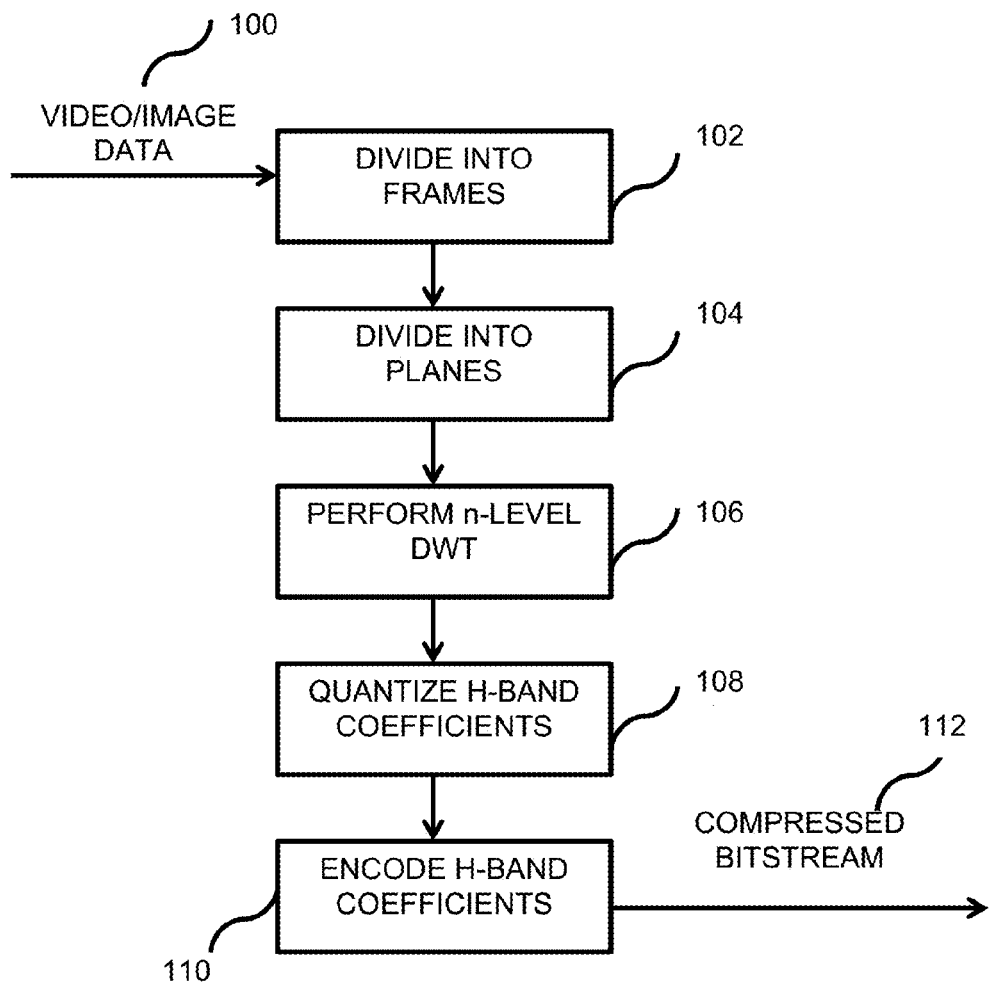
FIG. 1 is a flowchart illustrating the basic workflow of a DWT-based hierarchical subband decomposition as known from prior art.

FIG. 1 illustrates the basic workflow of a DWT-based hierarchical subband decomposition as known from prior art. Input (100) comes in the form of a series of 2D images that constitute video. In this embodiment each frame is successively considered and encoded separately (I-frame only mode), processed by block 102 (henceforth we will not distinguish cases of image and video, given their straightforward correspondence). Next, each frame is optionally separated into constituent image planes in block 104; there is a plurality of customarily used plane formats (most notably including RGB, YUV and YCbCr); the exact type and actual number of planes (which could be simply 1) are not relevant for this invention. Likewise, we do not distinguish here between a plurality of more specific representations (e.g., for YUV/YCbCr those customarily designated as 4:4:4, 4:2:2, 4:2:0, 4:1:1), as their processing specifics are well know in the art. (Furthermore, in one embodiment the actual input values are considered to be integers; however, this does limit the essence of the invention.) Each plane is now processed separately.

Block 106 performs the actual DWT hierarchical subband decomposition for a single frame, starting with the actual frame and recursively producing on each level 4 bands of coefficients (LL, HL, LH, HH), each band of ¼ size of that level's input. Any standard filter (e.g. Haar 2/2, LeGall 5/3, CDF 9/7) can be used; it is understood that certain integer filters (e.g. LeGall 5/3) allow for a perfectly reversible transformation, given their absence of non-deterministic rounding considerations. The decomposition is performed for a predetermined number n of levels; for convenience, input is indexed "level 0", and subsequent levels by consecutive integers, ranging from 1 to n. On each level, the LL band is treated as new input, subject to further dyadic recursive decomposition within block 106, and the 3 remaining H-bands are ready for coding/further processing. H-bands are then first subject to optional quantization in block 108. In one embodiment, the quantization performed is of the standard, scalar type; other types are known in the art, and the whole step is optional. It is understood that skipping quantization enables lossless compression (perfectly achieved only when coupled with a reversible integer DWT filter), otherwise compression is perforce of a lossy kind.

Finally, each 2D array of H-band coefficients is passed to block 110 for encoding; here is where the fundamental improvements of the present invention reside. Block 110 generates on its output a compressed bitstream (112).

The overall process of decoding/decompression proceeds as a conceptually analogous reversal of compression blocks, starting from the compressed bitstream 112, and eventually producing input data 100 (in case of lossy compression, the restored data will be only an approximation of the original data 100). Both coding and decoding are viewed as integral parts of the same overall method. This is particularly justified for intermediate (symmetric) codecs like the one presently disclosed.

Figure 2:
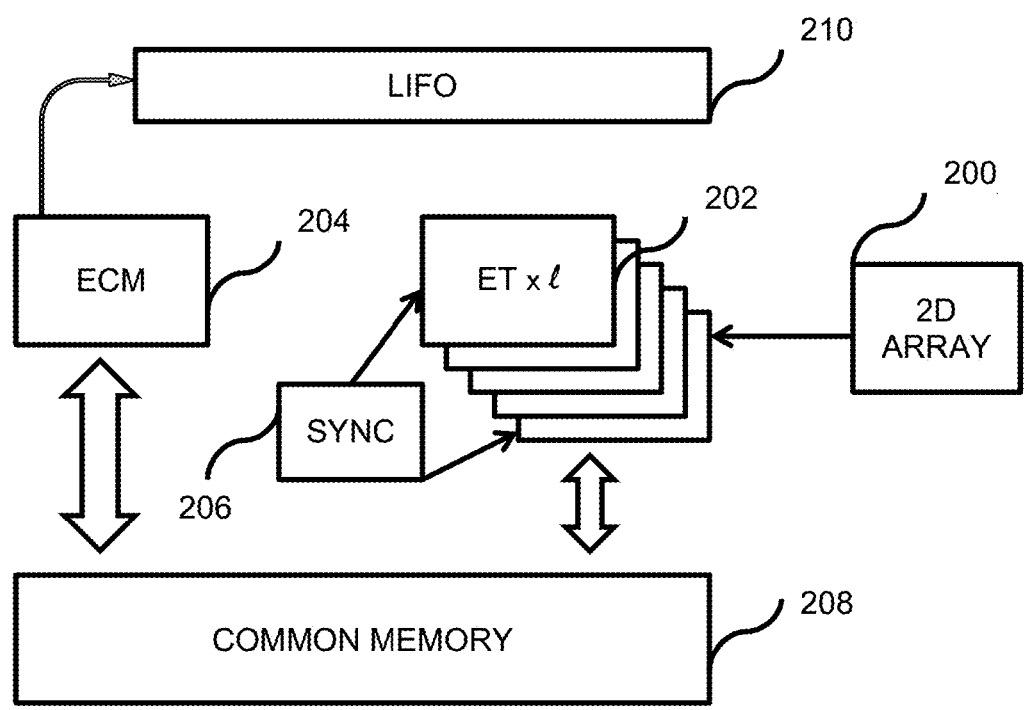
FIG. 2 is a block diagram of the structure of an embodiment of the encoding aspect of the present invention.
Figure 3:
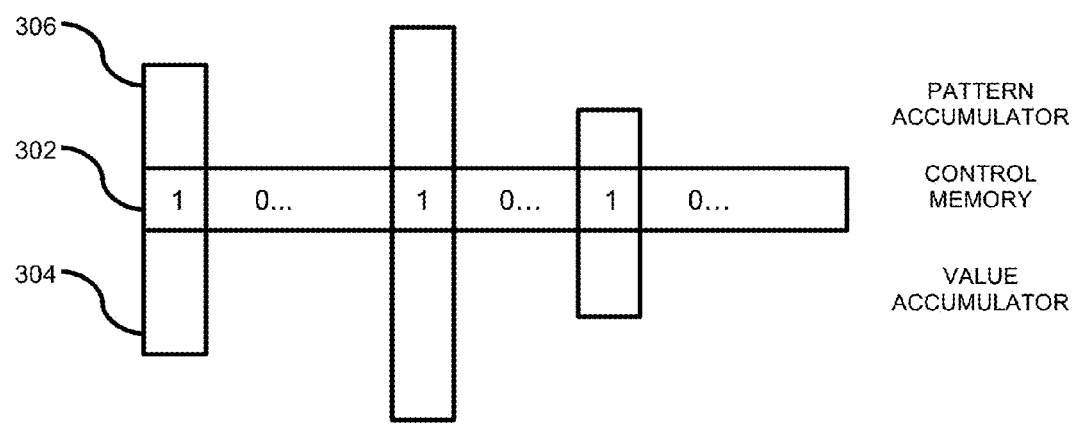
FIG. 3 is an illustration of the structure of one embodiment of encoding common memory.

FIG. 2 shows the structure of an embodiment of the encoding portion of the present invention. The major components are a plurality of encoding threads (ET) (202), an encoded control module (ECM) (204), a synchronization module (206) for synchronizing threads, encoding working common memory (208) accessible to both ECM 204 and all ETs 202, and used for their mutual communication (further structure of this common memory is shown in FIG. 3 and described below). The input given to the system, representing coefficients from a given level/band combination, comes in the form of a 2D coefficient array (200), accessible to all ETs 202. The system generates as its output a linear bitstream (210), which has the characteristics of a last-in-first-out list (LIFO), and will be denoted as LIFO here. Only ECM 204 writes to LIFO 210. Output to LIFO 210 comprises the eventual compressed stream for the given input.

FIG. 3 shows the structure of one embodiment of encoding common memory 208. It is based on an array of fixed length l, where each element comprises three parts: (i) binary control memory (302); (ii) pointer to variable-length binary value string (possibly null); (iii) pointer to variable-length binary pattern string (possibly null). As as result, this structure can be conceptually viewed as three separate data structures in a manner that should be clear to one skilled in the art. One is of fixed length, termed here control memory 302, the other two are of variable length, termed here value accumulator (304) and pattern accumulator (306), respectively. Value accumulator 304 comprises the plurality of individual value strings; pattern accumulator (306) comprises the plurality of individual pattern strings.

Figure 4:
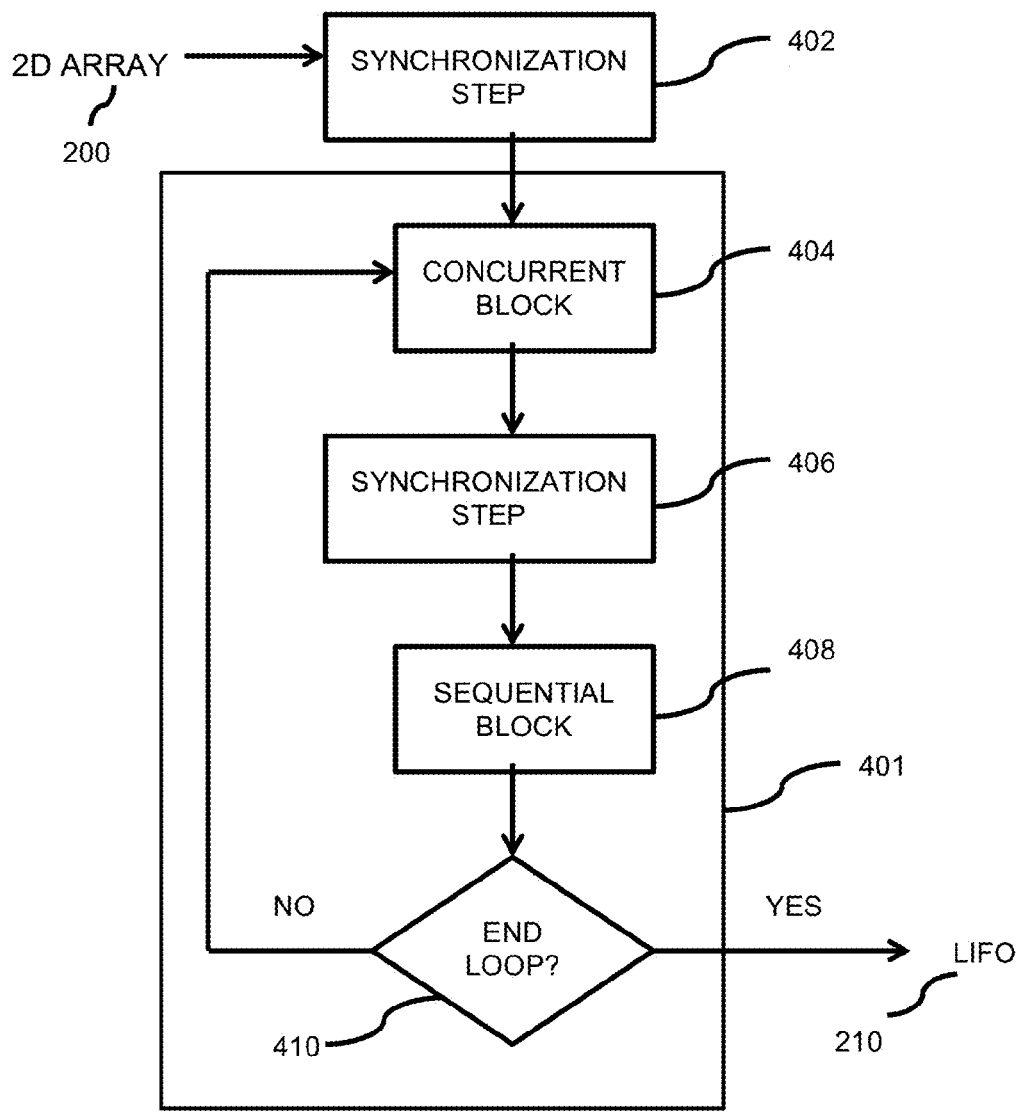
FIG. 4 is a flowchart of the basic operation of the encoding aspect of the present invention.

FIG. 4 gives a flowchart of the basic operation of compression aspect of the present invention. For convenience of reference, it will be described in a series of sections below (1-8).

1. Input 200 is given to the system; output LIFO 210 begins empty. A total of l instances of ETs 202 are initiated, with $l=4^{m-1}$, $m=\log_4 a$, and a=total coefficient input size; m will also be the maximum number of iterations. Prior to entering the main iterative loop 401, a synchronization step 402 is performed on all ETs 202 by synchronization module 206. Loop 401 comprises the following main steps in sequence: concurrent block 404, during which a plurality of ETs 202 execute operations as described in sec. 2-4 below; synchronization step 406 performed on all ETs 202 by synchronization module 206; sequential block 408, during which ECM 204 executes operations as described in sec. 2-4 below; and finally, loop control block 410.

2. The method proceeds as a sequence of iterations inside loop module 401, controlled and managed within block 410. When entered, block 410 first tests for end of loop, which is a disjunction of two conditions: no ET wrote out a "0" to the control memory (i.e., no ET performed aggregation), or just a single ET is left. If end of loop condition is not satisfied, the number of active ETs is reduced to ¼ for the subsequent iteration, as detailed in sec. 4. The maximum number of iterations m (constant for a given level, across all bands and frames) is stored and transmitted as a parameter of compression, in the compressed bitstream in a manner well known in the art. If total number of iterations was below maximum m for a given band, the shortfall s is transmitted along with compressed data. It is understood that all VLC coding is performed by prefix-coding or other self-delimiting (uniquely decodable) methods. Single writes by ECM 204 to LIFO 210 (as described in sections 3 and 4) are termed "records" for convenience of reference; it is understood that there are no explicit delimiters between them, and elements of each record are self-delimited as described in the previous sentence; therefore, LIFO 210 consists of an encoded bitstream of self-delimited binary codes, which encode either patterns or values.

3. In the first iteration, within concurrent block 404, each ET performs these steps: a) Analyze its corresponding 4-square (2×2) of input coefficients, based on a specific (recursive raster) 2D to 1D mapping of threads into a linear array of indices. b) Perform reduction operator, i.e. output to its assigned spot in control memory 302: If all 4 values are 0 then 0 else 1 (outputting 0 is termed "aggregation"); c) Classify analyzed pattern in terms of NZV (non-zero values), into one of 16 binary options (in raster scan of the 4 positions—from "0000" to "1111", mapped sequentially to symbols #0-#15, with #0 representing "0000"); d) Use probability distribution of the NZV symbols #1-#15 (described in sec. 6) to generate VLC and write it to ET's assigned place in pattern accumulator 306; e) Use probability distributions to determine VLC for actual value (sign+magnitude) of any NZV entries (1-4 of them) and write them in sequence to ET's assigned place value accumulator 304 (as described in sec. 5). Next, perform synchronization step 406 on all ETs 202 by synchronization module 206. Block 406 (as well as other invocations of 206) are necessary since all ETs are conceptually concurrent and synchronous, but not necessarily actually executing in parallel; alternative embodiments could have different levels of parallelism. Next, within block 408, ECM 204 performs the following: a) Sequentially scan value accumulator 304, concatenate together all non-zero (non-null) VLC entries into a value string that is added as first record to LIFO 210; release value accumulator 304 (null its memory); b) Sequentially scan pattern accumulator 306 (with appropriate stride, initially 1), concatenate together all non-zero (non-null) VLC entries into a pattern string that is added as next record at the front of LIFO 210; release pattern accumulator 306 (null its memory).

4. Prior to each subsequent iteration, loop control block 410 will keep active ¼ ETs from previous iteration: all those with index number i divisible by $l=4^j$, (i.e., i mod $4^j=0$), j being the 0-based iteration number. Each active ET 202 performs the same steps as in the initial iteration within block 404, with two exceptions: 1) in step (a) the values analyzed are the 4 control memory values starting from the ET's current index, with a stride of $4^{j-1}$; 2) step (e) is omitted. Next, synchronization step 406 is performed on all ETs 202 by synchronization module 206, as in first iteration. ECM 204 performs only part (b) from the initial iteration, in identical manner, within block 408.

5. In one embodiment of the present invention, the VLC for values written to value accumulator 304 is a signed Elias gamma code. Values are assumed to be non-zero signed integers, represented in "sign and magnitude" form; the former is coded by a single bit and the latter split into binary exponent (MSB position, 0-based) and mantissa (remainder). The Elias gamma code is self-delimiting, created by prepending a unary code of the MSB position (effectively, the length) to the binary representation of the magnitude. Therefore, example binary codewords would be: for magnitude 1—"1"; for magnitude 3—"011"; for magnitude 6—"00110", etc. In another embodiment, signs are assumed to have a generally uniform distribution and are coded with a full single bit in the four single-NZV patterns (#1, 2, 4, 8). Sign differentials in multi-NZV patterns generally have skewed distributions and are coded accordingly. (E.g., of the 4 sign patterns possible in each of the 4 cases with exactly two axis-aligned "1" values (#3, 5, 10, 12-"0011", "0101", "1010", "1100") in the LH band, equal signs are considerably more likely (in general) in the vertical line cases (#5, 10), and considerably less likely in the horizontal line cases (#3, 12). Magnitudes in non-all-NZV patterns (all except #15) generally are heavily skewed towards low values and are VLC (entropy) coded according to known distributions (e.g., "1" being by far the most common value in single-NZV cases). For case #15 one embodiment would use JPEG-LS or similar approach well known from the art (as in that case values are generally correlated, but not necessarily expected to be close to 0).

6. The VLC of the 15 symbols written to LIFO 210 (symbols #1-15) is based on known measured non-uniform probability distributions (single-NZV symbols being considerably more frequent than the rest, followed by 2-NZV symbols, etc.). In one embodiment, the VLC prefix code for encoding 15 symbol classes includes the codewords: 000; 001; 010; 011; 100; 101; 1100; 1101; 111000; 111001; 111010; 111011; 111100; 111110; 111111. Here, single-NZV symbols would map into the first 4 codewords. Such a code is denoted here VLC-1. In another embodiment, the VLC prefix code for encoding 15 symbol classes includes the codewords: 00; 01; 10; 110; 111000; 111001; 111010; 111011; 111100; 111101; 111110; 11111100; 11111101; 11111110; 11111111. Here again, single-NZV symbols would map into the first 4 codewords. Such a code is denoted here VLC-2. Assuming distributions with single-NZV symbols considerably more probable than the rest, the average code length will normally be shorter than the uniform 4-bit fixed length code needed for the 15 symbols, and therefore provide compression. Generally, as used herein (and elaborated in sections 5 and 6), the terms "variable length coding" (VLC) or "entropy-coding" for a single symbol or value refers to one of the methods described in standard references (e.g., D. Salomon and P. Motta, "Handbook of Data Compression", Springer, 2010). Likewise, in certain aspects of the present invention (e.g., for some of the NZV patterns appearing on higher levels), if the statistics would justify doing so, 4-bit fixed-length codes could be used instead, without limitation of generality of the approach, and retaining a useful degree of compression; such fixed-length codes can always be considered a degenerate case of VLC. Therefore, the particular coding choice is not important for the method presented herein to work, provided the coding is used in a proper manner. Thus, the expression "VLC" is used herein to identify coding pursuant to one of these methods. Concurrently, a significant objective of the invention is to allow use of fast methods of low complexity for the symbol coding.

7. In one embodiment, the statistics (i.e., probability distributions) needed for the two types of entropy-based coding (VLC) used above are compiled and updated once a frame, for each given plane/level/band combination, then encoded and transmitted as side information between frames, to be used with the next frame Since it is information that is part of the compressed stream, it is available to the decoder, without dependency on any previous frames decoded (i.e., enabling random access single frame decoding). The initial statistics for the first frame can be precompiled based on a large corpus of data. In an alternative embodiment, such precompiled statistics could be used the fixed values instead of the adaptive approach outlined earlier in this section, trading off space savings in side information and statistic computation time against more modest compression ratios.

8. At the final DWT level (level n) optionally encode the remaining LL band through any standard VLC method. One embodiment would view the individual values in as a combination of sign (optional), exponent (binary; equivalently—MSB position) and mantissa (equivalently—LSB sequence), and employ some variant of JPEG-LS (or other combination of DPCM and/or predictive and Golomb-Rice coding) for coding the correlated sequence of exponents (e.g., as disclosed in C. Chrysafis and A. Ortega, "Line Based, Reduced Memory, Wavelet Image Compression", Proc. IEEE Data Compression Conference (Snowbird, Utah), 1998); in an alternative embodiment, a DCT transform would be applied, followed by known methods for coefficient compression.

Figure 5:
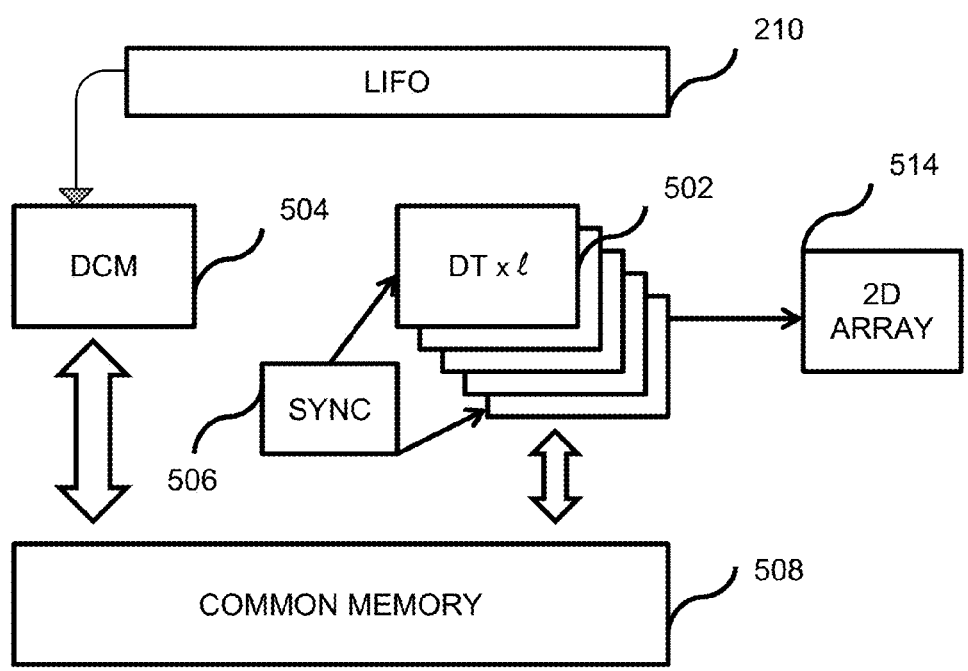
FIG. 5 is a block diagram of an embodiment of the decoding aspect of the present invention.
Figure 6:
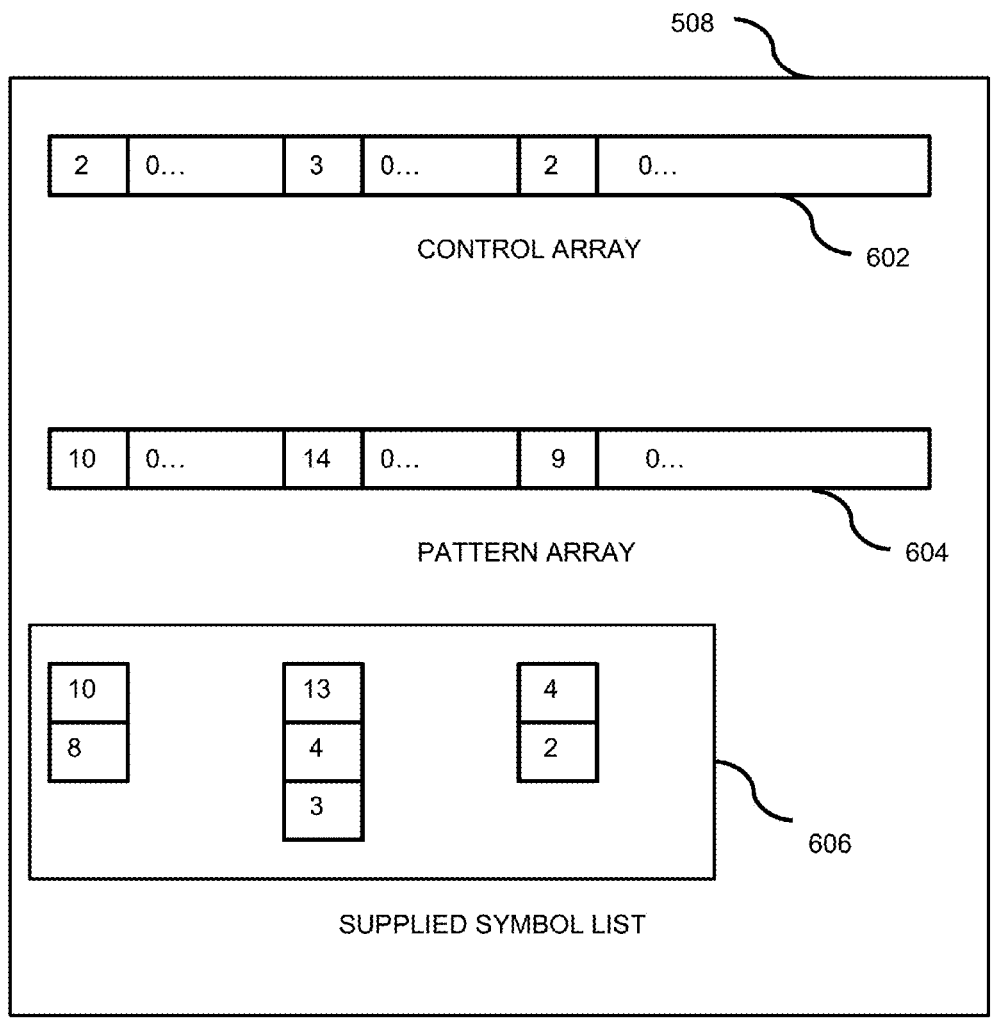
FIG. 6 is an illustration of the structure of one embodiment of decoding common memory (based on actual values from traced example).

FIG. 5 shows the structure of an embodiment of the decoding portion of the present invention. The major components are a plurality of decoding threads (DT) (502), a decoding control module (DCM) (504), a synchronization module (506) for synchronizing DTs, decoding working common memory (508) accessible to both DCM 504 and all instances of DT 502, and used for their mutual communication (further structure of this common memory is shown in FIG. 6 and described below). The LIFO 210 is presented as input to this subsystem, to be processed in last-in-first-out list (LIFO) manner. Only DCM 504 reads from LIFO 210. The system generates as its output a 2D coefficient array (514), accessible for writing to all DTs 502. Dimensions of 514 are k×k, where k=SQRT (l). In embodiments implementing lossless compression, 514 will be identical to the original 2D coefficient array 200; in embodiments implementing lossy compression, 514 will be a close approximation of 200.

FIG. 6 shows the structure of one embodiment of decoding common memory 508. It is based on an array of fixed length l, where each element comprises three parts: (i) integer control field; (ii) integer pattern field; (iii) pointer to variable-length supplied symbol list (possibly null). As a result, this structure can be conceptually viewed as three separate data structures in a manner that should be clear to one skilled in the art. Two are of fixed length, termed here control array (602), and pattern array (604), respectively; the third is of variable length, termed here supplied symbol list (606).

Figure 7:
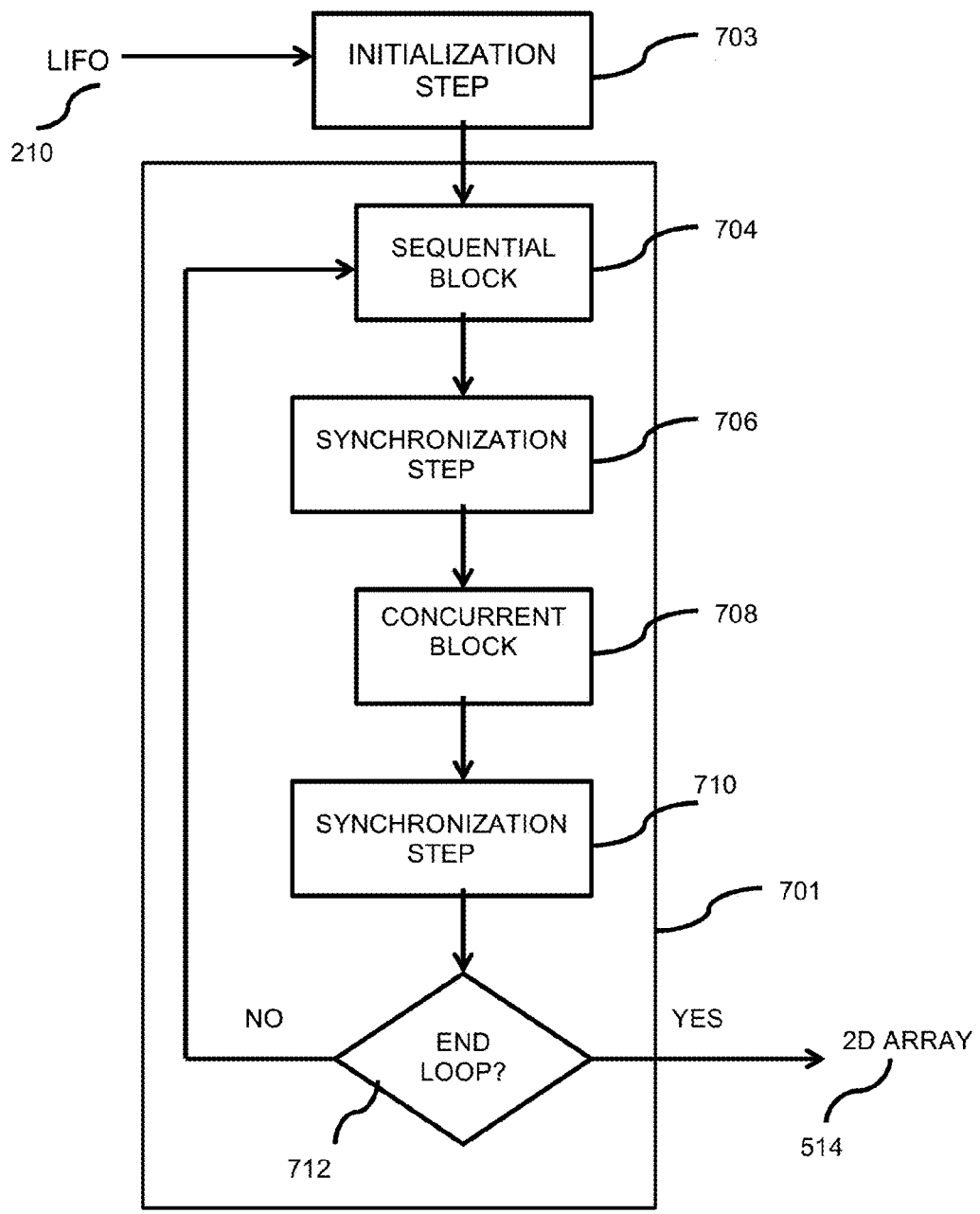
FIG. 7 is a flowchart of the basic operation of decoding aspect of the present invention.

FIG. 7 gives a flowchart of the basic operation of decompression aspect of the present invention. For convenience of reference, it will be described in a series of sections below (9-11); for clarity, the section numbering is kept sequential and distinct from compression section enumeration.

9. The LIFO 210 is given as input to the system; it is understood that it might contain at its beginning information about supplied statistics, as detailed in sec. 7, as well as other ancillary information whose presence and handling do not influence the basic claims of this invention. Output array 514 begins with all values initialized to 0. A total of l instances of DT 502 are initiated, with l=$4^{m-1}$, each with an index mapping into a 2D image structure exactly as in the ET case. Prior to entering the main iterative loop 701, an initialization step 703 is performed. Loop 701 comprises the following main steps in sequence: sequential block 704, during which DCM 504 executes operations as described in sec. 10-11 below; synchronization step 706 performed on all DTs 502 by synchronization module 506; concurrent block 708, during which DTs 502 execute operations as described in sec. 10-11 below; synchronization step 710 performed on all DTs 502 by synchronization module 506; and finally, loop control block 712. The ultimate task of each DT 502 is to first determine the value of its final symbol in pattern array 604, then expand that code into the full sequence of 4 values (forming the corresponding 4-square in output 514). This is achieved by means of an iterative process of at most m steps described in sec. 10-11 below. By convention, iteration numbering is zero-based and in each iteration j the number of active DTs is $4^j$; therefore the first iteration (j=0) has a single active DT. Each DT is activated in iteration j=m-k'-1 where k' corresponds to the highest value k<m that makes its linear index divisible by $4^k$ (e.g., in case m=3, for DT 0: j=0; for DT 12: j=1; for DT 14: j=2). Both control array 602, and pattern array 604 of length l are initialized with all values at 0; supplied symbol list 606 is initialized to null elements. The initialization step 703 is performed by DCM 504 thus: If there is no maximum iteration shortfall (i.e., s=0), pop the top symbol codeword off LIFO 210, decode it, assign it as first value (at index 0) of pattern array 604, determine its NZV size (i.e., number of NZV elements, ranging 1-4), assign that as first value (at index 0) of control array 602. If the maximum iteration shortfall s>0, set initial iteration index to j=s, correspondingly pop 4' top symbol codewords off LIFO 210, and perform decode and assign operations for appropriate indices of arrays 604 and 602 as for case j=0.

10. The method proceeds as a sequence of iterations inside loop module 701, controlled and managed within block 712. When entered, block 712 first tests for end of loop condition, reached when iteration index j=m-1. As described later in sec. 11, the last iteration (j=m-1) has certain special-case handling which is flagged within block 712. If end of loop condition is not satisfied, increase j by 1, then activate three times more DTs, those with linear indices divisible by $4^{m-j-1}$. Following that, DCM 504 sequentially performs the following steps (a)-(c) in block 704: a) Sequentially examine active elements of control array 602 (indices with stride $4^{m-j-1}$), each containing integer values 0-3 representing NZV count; b) For each examined element, pop off that many codewords from LIFO 210, then decode them as a sequence of pattern symbols; c) For each examined element, perform assignment of that sequence of symbols to supplied symbol list 606, at index corresponding to examined element (this sequence will be empty in cases corresponding to "0" values observed in control array 602). Next, perform synchronization step 706 on all DTs 502 by synchronization module 506. Analogously to the ET case, block 706 (as well as other invocations of 506) are necessary since all DTs are conceptually concurrent and synchronous, but not necessarily actually executing in parallel; alternative embodiments could have different levels of parallelism. Each active DT 502 performs the following steps (a)-(d) within block 708, in all iterations except the final iteration (whose specifics are described in sec. 11): a) Observe current value of its symbol in pattern array 604 and transform the symbol into its 4-bit binary form; b) Replace the "1" bits in this binary string sequentially with symbols from DT's corresponding element in supplied symbol list 606, thus creating a length-4 string of symbols (some or all of which might be 0) and release that memory element from list 606; c) Write each of these symbols into the 4 positions in pattern array 604 indexed at $4^{m-j-2}$ apart (as defined in sec. 9), starting from DT's current position in array 604 (in practice, only NZVs need be written); d) Finally, determine length-4 string of lengths (corresponding to the 4 written symbols) and write these values in control array 602, at identical index positions as the symbols just written to pattern array 604. Next, perform synchronization step 710 on all DTs 502 by synchronization module 506. Finally, perform loop control actions within block 712.

11. The final iteration of loop 701 (as indicated in sec. 9, corresponding to j=m−1) has the following differences from prior iterations. Within block 704, DCM 504 performs steps: a) Identical to regular iterations; b) Same as regular iterations, except now decode codewords popped from LIFO 210 as values (based possibly on known statistics supplied as side information); c) Same as regular iterations, except elements written from list 606 to corresponding positions in pattern array 604 now represent values. Within block 708, each DT 502 in performs these steps: a) Same as regular iterations; b) Same as regular iterations, except now created is a length-4 string of values; c) Restore original 4-square of values (associated with DT 502) in output array 514, from length-4 string of values, based on standard raster order; d) Omit. This ends operation within block 708 for the final iteration (i.e., step (d) of regular iterations is omitted).

Figure 8:
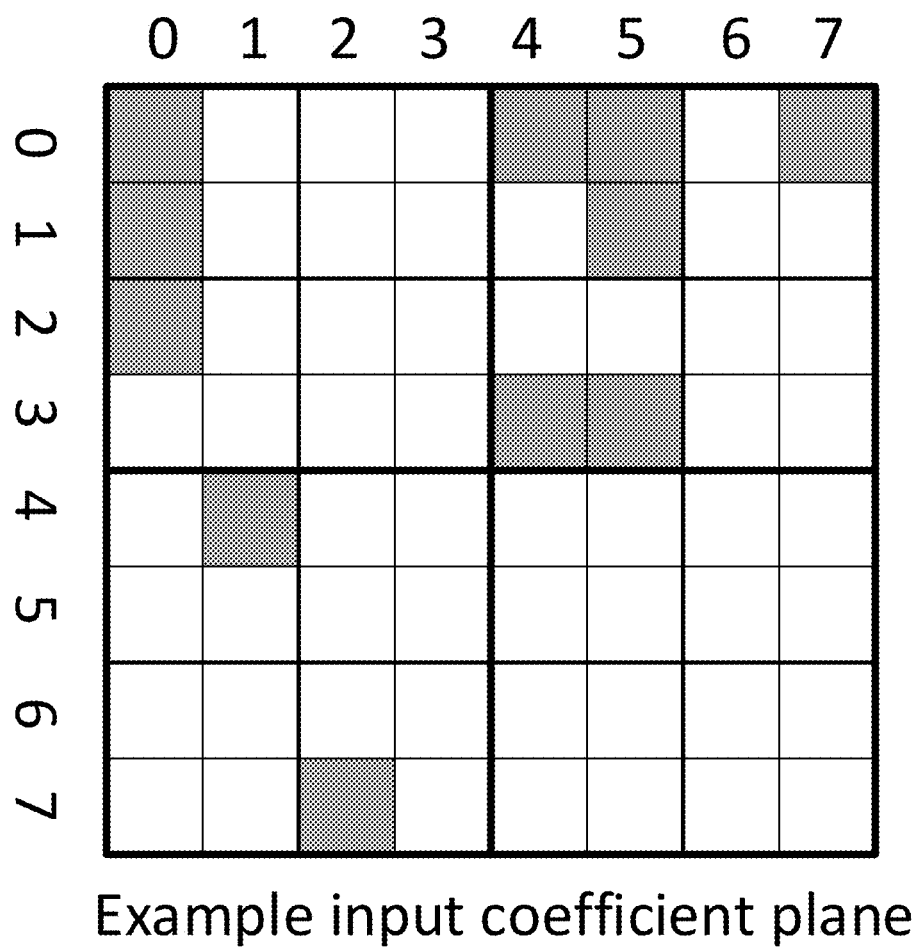
FIG. 8 is a visual representation of the example 8×8 input array of coefficients, containing zero and non-zero values. All values are 0, except at the following (x,y) index pairs (0-based indexing, from top left): (0,0), (0,1), (0,2), (1,4), (2,7), (4,0), (4,3), (5,0), (5,1), (5,3), (7,0).
Figure 8:
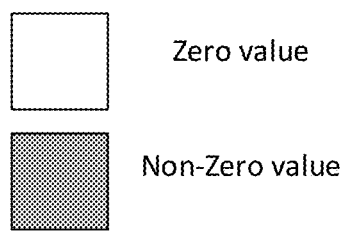

The operation of both the compression and decompression aspects of the present invention can be illustrated by means of a simple example, resulting from a hypothetical original 16×16 image, with a=64, m=3 and l=16, and where a first-level DWT transform generates 4 subbands of quarter size, 8×8. For the purpose of tracing changes to the pattern portion of LIFO 210 and to control memory 208, actual non-0 values are not important, as they only matter for value portion of LIFO 210). FIG. 8 illustrates such an 8×8 input array, with white squares representing '0' values, and shaded squares representing arbitrary NZVs. FIG. 9 shows the state of the encoding control memory 208 during each of the 3 iterations. FIG. 10 shows the state of the decoding control memory 508 during each of the 3 iterations.

CONCLUSION

A method and apparatus for compression and decompression is described. While the invention has been presented in detail herein in accordance with certain preferred embodiments thereof, various modifications and changes therein should be apparent to those skilled in the art. In certain cases, the present invention may be practiced without these specific details. In other instances, well-known devices and structures are shown in block diagram form, rather than in detail. Some examples of such specifics are given below.

In one embodiment of this invention the pattern codes on levels following the first one are output to the pattern LIFO as VLC. It is understood that fixed length codes are special (degenerate) form of VLC, in a way that is clear to one skilled in the art. In certain cases (of high entropy for pattern distribution on higher levels) it could be more advantageous to keep this method and we consider that all combinations of fixed and VLC codes are covered by this disclosure.

The current invention disclosure assumes that compression begins with a being a power of 4 (i.e., the 2D coefficient array has equal dimensions of power-of-2 length). When this is not the case, the input 2D coefficient array should be padded by virtual "0" elements, up to the nearest power-of-2 square; i.e., inclusively up to index value (in 0-based indexing) ceil ($\log_2$ d)−1 along a given dimension, where n is the size of a that dimension (which should be recorded) prior to compression. Analogously, these padded values will be discarded upon decompression, reducing the coefficient array (and ultimately image) to its known original size.

The presented detailed description is based on a specific (recursive raster) 2D to 1D mapping of threads into a linear array of indices; however, any space-filling curve could be used instead. Such methods are well known in the art, having been described in standard references, e.g. M. Bader, "Space Filling Curves", Springer, 2013.

In summary, it is intended by the appended claims to cover all such modifications and changes as fall within the true spirit and scope of the invention.

What is claimed is:

1. A method for encoding and decoding a two-dimensional array of numerical values, the array including N lines of length K, where N and K are positive integers, on a parallel computer processor, comprising the steps of:
   providing L concurrent synchronized encoding threads that execute at most M fixed-sized operations each, where M=ceil ($\log_2$(max(N,K))) and L=(max(N,K))$^2$/4;
   partitioning said array into square 2×2 pixel areas, whereby each one is mapped to a specific one of said encoding threads;
   transforming non-zero values observed by each of said threads in their respective areas of said array, employing self-delimiting variable-length coding, thereby producing value codewords;
   assembling all said value codewords into a linear bitstream;
   transforming positional information of said non-zero values in said array by said encoding threads, employing self-delimiting variable-length coding, thereby producing position codewords;
   adding all said position codewords into said linear bitstream;
   providing L concurrent synchronized decoding threads that execute at most M fixed-sized operations each;
   interpreting said linear bitstream, whereby said variable-length code position codewords are decoded into said non-zero value positional information, wherein said non-zero value positional information is assigned to their corresponding instances of said decoding threads; and
   interpreting said linear bitstream, whereby said variable-length code value codewords are decoded and combined with said non-zero values positional information by said decoding threads to restore said two-dimensional array;
   whereby said linear bitstream represents a compressed version of said two-dimensional array, wherein complexity of said method increases only logarithmically with linear size of said two-dimensional array.

2. The method recited in claim 1, wherein said method appears as an integral part of a broader method of image compression and decompression based on the discrete wavelet transform (DWT), such broader method comprising a plurality of these steps:
   (i) performing a subband decomposition of said image by recursive application of two-dimensional DWT on an ordered plurality of levels, whereby each said level is represented by four coefficient bands (LL, HL, LH, HH) of quarter size, wherein each said LL band is passed as input to next of said levels;
   (ii) encoding said coefficient bands on all said levels, thereby producing a compressed bitstream;
   (iii) decoding said compressed bitstream, thereby restoring raw values for said coefficient bands; and
   (iv) performing a recursive application of two-dimensional inverse DWT on an ordered plurality of levels with said coefficient bands, thereby restoring said image;
   whereby said method is employed to encode all said coefficient bands, with or without quantization, into said compressed bitstream, and said method is furthermore employed to decode said compressed bitstream, with or without dequantization, thereby restoring raw values for said coefficient bands on all said levels.

3. The method recited in claim 2, wherein said self-delimiting variable-length coding of said non-zero values is performed by Elias gamma code.

4. The method recited in claim 2, wherein said self-delimiting variable-length coding of said positional information is performed by either VLC-1 code or VLC-2 code.

5. The method recited in claim 2, wherein said self-delimiting variable-length coding of said non-zero values is performed by Elias gamma code, and wherein said self-delimiting variable-length coding of said positional information is performed by either VLC-1 code or VLC-2 code.

6. The method recited in claim 1, wherein said self-delimiting variable-length coding of said non-zero values is performed by Elias gamma code.

7. The method recited in claim 1, wherein said self-delimiting variable-length coding of said positional information is performed by either VLC-1 code or VLC-2 code.

8. The method recited in claim 1, wherein said self-delimiting variable-length coding of said non-zero values is performed by Elias gamma code, and wherein said self-delimiting variable-length coding of said positional information is performed by either VLC-1 code or VLC-2 code.

9. An apparatus for encoding a source two-dimensional array of numerical values, the array including N lines of length K, where N and K are positive integers, the apparatus comprising:
   (i) L concurrent synchronized encoding threads that execute at most M fixed-sized operations each, where M=ceil ($\log_2(\max(N,K))$) and L=$(\max(N,K))^2/4$, whereby each of said threads performs transformation of said source array into linear bitstream codewords;
   (ii) synchronizing module for synchronizing operation of said threads;
   (iii) encoding control module for managing results of said threads;
   (iv) control memory accessible for read and write to all said threads and said control module;
   (v) list data structure for said control module to output compressed representation of said array, wherein said compressed representation comprises a plurality of said bitstream codewords; and
   (vi) looping mechanism for engaging the operation of a plurality of said elements (i)-(v) in an iterative loop with defined end conditions;
wherein said threads transform non-zero values observed by each of said threads in their respective areas of said array, through self-delimiting variable-length coding into value codewords, wherein said threads and said control module transform positional information of said non-zero values in said array through self-delimiting variable-length coding into position codewords, and wherein said control module assembles all said value codewords and all said position codewords into said linear bitstream.

10. The apparatus recited in claim 9, wherein said apparatus appears as an integral part of a broader system for compression of input image based on the discrete wavelet transform (DWT), such broader system comprising these steps:
   (i) performing a subband decomposition of said image by recursive application of two-dimensional DWT on an ordered plurality of levels, whereby each said level is represented by four coefficient bands (LL, HL, LH, HH) of quarter size, wherein each said LL band is passed as input to next of said levels;
   (ii) encoding said coefficient bands on all said levels, thereby producing a compressed bitstream;
   and wherein said apparatus processes a plurality of said coefficient bands, thereby performing the (ii) encoding step.

11. The apparatus recited in claim 10, wherein said self-delimiting variable-length coding of said non-zero values is performed by Elias gamma code.

12. The apparatus recited in claim 10, wherein said self-delimiting variable-length coding of said positional information is performed by either VLC-1 code or VLC-2 code.

13. The apparatus recited in claim 10, wherein said self-delimiting variable-length coding of said non-zero values is performed by Elias gamma code, and wherein said self-delimiting variable-length coding of said positional information is performed by either VLC-1 code or VLC-2 code.

14. An apparatus for decoding a linear bitstream of a certain format, whereby said bitstream is transformed into a two-dimensional array, the array including N lines of length K, where N and K are positive integers, the apparatus comprising:
   (i) L concurrent synchronized decoding threads that execute at most M fixed-sized operations each, where M=ceil ($\log_2(\max(N,K))$) and L=$(\max(N,K))^2/4$, whereby each of said threads performs transformation of portions of said bitstream into elements of said array;
   (ii) synchronizing module for synchronizing operation of said threads;
   (iii) decoding control module for managing results of said threads;
   (iv) control memory accessible for read and write to all said threads and said control module; and
   (v) looping mechanism for engaging the operation of a plurality of said elements (i)-(iv) in an iterative loop with defined end conditions;
wherein said threads and said control module interpret said linear bitstream as a series of self-delimiting variable-length code non-zero value position codewords and self-delimiting variable-length code value codewords, wherein said non-zero value position codewords are decoded into said non-zero value positions and assigned to their corresponding instances of said decoding threads; and whereby said variable-length code value codewords are decoded and combined with said non-zero values positions by said decoding threads to output said two-dimensional array.

15. The apparatus recited in claim 14, wherein said apparatus appears as an integral part of a broader system for image decompression based on the inverse discrete wavelet transform (DWT), such broader system comprising these steps:
   (i) taking as input a compressed bitstream of certain format, as might be produced by an image compression system based on multi-level subband DWT decomposition;
   (ii) decoding said input as a plurality of encoded coefficient bands, thereby restoring raw values for said coefficient bands on an ordered plurality of levels;
   (iii) recursively applying a two-dimensional inverse DWT on the ordered plurality of levels with said coefficient bands, thereby restoring said image;
and wherein said apparatus processes a plurality of said coefficient bands, thereby performing the (ii) decoding step.

16. The apparatus recited in claim 15, wherein said self-delimiting variable-length codes of said non-zero values are interpreted as Elias gamma code.

17. The apparatus recited in claim 15, wherein said self-delimiting variable-length coding of said positional information are interpreted as either VLC-1 code or VLC-2 code.

18. The apparatus recited in claim 15, wherein said self-delimiting variable-length codes of said non-zero values are interpreted as Elias gamma code, and wherein said self-delimiting variable-length codes of said positional information are interpreted as either VLC-1 code or VLC-2 code.

* * * * *